Patented May 26, 1936

2,042,219

UNITED STATES PATENT OFFICE 2,042,219

PREPARATION OF UNSATURATED ETHERS

Herbert P. A. Groll, Oakland, and Clarence J. Ott, Berkeley, Calif., assignors to Shell Development Company, San Francisco, Calif., a corporation of Delaware No Drawing. Application January 29, 1934, Serial No. 708,928

28 Claims. (Cl. 260—151)

This invention relates to the production of unsaturated ethers and the resulting products by effecting, under alkaline conditions in the presence of water, the reaction of an unsaturated organic halide comprising an unsaturated alkyl chain containing at least three carbon atoms, said chain possessing at least one halogen atom attached to a saturated carbon atom of said chain, with an alcohol.

More particularly our invention is concerned with the production of unsaturated ethers of the formula R—O—R' by effecting, under alkaline conditions in the initial presence of water, the reaction $$R\ Hal\ +R'OH \rightarrow R\text{—}O\text{—}R'+H\ Hal$$

wherein R Hal represents an unsaturated organic halide comprising an unsaturated alkyl chain containing at least three carbon atoms and at least one halogen atom attached to a saturated carbon atom of said chain, and R'OH represents an organic hydroxy compound.

The term "organic hydroxy compound" is used in this specification and the appended claims to designate those compounds of aliphatic, aralkyl or cyclic character which possess one or more hydroxyl groups to the molecule. In accordance with accepted usage, the hydroxyl part of a carboxylic acid radical is never considered apart from the carboxylic acid radical proper. Such a compound may be: the saturated or unsaturated, primary, secondary or tertiary monohydric alcohols such as methyl, ethyl, propyl, isopropyl, butyl, isobutyl, secondary butyl, tertiary butyl, amyl, secondary amyl, tertiary amyl, benzyl, cinnamyl, allyl, methyl allyl and the like; or may be a cyclic compound having at least one hydroxy group attached to the nucleus of the molecule such as phenol, cresol, resorcinol, the naphthols, hydroquinone and the like; or may be a polyhydric alcohol such as ethylene glycol, propylene glycol, isobutylene glycol, diethylene glycol, mannitol, arbitol and the like; or may be a mixed primary, secondary or tertiary polyhydric compound such as methyl glycerol, glycerol, 1.2 propylene glycol, 1.2 and 1.3 butylene glycols and the like as well as homologues, analogues and substitution products of such compounds. For example, ethers of polyhydric alcohols are useful, provided they contain at least one hydroxyl group.

The reaction comprising our process may be effected under alkaline conditions in the absence of water other than that formed during the course of the reaction to form ethers of the formula R—O—R' wherein R represents an unsaturated organic halide comprising an alkyl chain containing at least three carbon atoms and at least one halogen atom attached to a saturated carbon atom of said chain, and R' represents the radical of an organic hydroxy compound, R' containing one or at least three carbon atoms when R represents

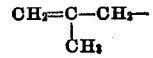

but in the majority of cases it was found that better results are obtained if the reaction is effected under alkaline conditions in the initial presence of a fairly substantial amount of water.

The reaction of the organic halide with the organic hydroxy compound is readily and easily effected by our process, which utilizes the following mode of operation. The organic unsaturated halide and the organic hydroxy compound are mixed either dry or in the presence of a substantial amount of water. The reaction may be effected when equimolar quantities of the reactants are employed, but it is in general more expedient to employ an excess of the organic hydroxy compound for the majority of the reactants, particularly when the organic halide employed is readily hydrolizable under normal operating temperatures. The reaction is conducted under alkaline conditions to obviate any further reaction of the hydrogen halide liberated as the reaction proceeds. Alkaline conditions are ensured by the initial, intermittent or continuous addition of an excess of a basic metal compound to the mixture of the reactants. The basic metal compound may be applied as an aqueous solution or suspension or solution in any suitable solvent which may or may not be inert to the liberated hydrogen halide. Suitable basic metal materials that may be employed are hydroxides, oxides, carbonates or other salts of weak acids of alkali or alkaline earth metals or mixtures thereof. For the purpose of economy and general convenience the alkali and alkaline earth metal hydroxides are employed in the majority of cases. The better results obtained, in the majority of cases, when the reaction is effected in the initial presence of substantial amounts of water may be attributed to the fact that the hydroxides, oxides, carbonates and other basic salts of the alkali and alkaline earth metals are practically insoluble in the aliphatic alcohols having more than four carbon atoms to the molecule. The solid basic material in contact with the reactants may become incrusted and thus rendered practically inactive.

Agitation of the reactants is useful whenever the reaction mass is of a heterogeneous state. For example, the reaction mixture may comprise two liquid phases, one consisting of the aqueous alkali solution and the other consisting of a solution of organic halide and organic hydroxy compound, in which case by suitable agitation the reaction may proceed as rapidly and effectively as if the reaction mixture is homogeneous. When the solution is homogeneous, the reaction proceeds smoothly without agitation.

The process can be executed at subatmospheric, atmospheric or super-atmospheric pressures, depending on the reactants employed and the particular operating conditions.

The reaction which is in general exothermic, usually starts at slightly elevated temperatures and maintains itself by the heat of reaction, necessitating temperature control, in most instances, by suitable cooling means, if large quantities are reacted. The process can be executed at varying temperatures, depending largely on the temperature and rate of hydrolysis of the unsaturated halide employed and on the heat stability of the resulting product. We have discovered that many of the unsaturated ethers of the type formed in our process are readily polymerized in the presence of strong alkalies at temperatures substantially above about 100° C. Therefore, it is, in most cases, desirable to avoid this side reaction by working at temperatures below 100° C., or to shorten the time of contact of the reactants at higher temperatures. In our process the rate of ether formation is in the vast majority of cases substantially greater than the rate of hydrolysis of the unsaturated organic halide. Substantial amounts of ether are thus produced even though one operates in a temperature range favoring the substantial hydrolysis of the halide. The average amount of water present during the reaction may vary considerably, substantial amounts of ether may be formed even when the molecular concentration of water exceeds that of the alcohol. In the majority of cases sufficient water was added to make the mol. ratio of organic halide to initial water content in the reactant mixture from about 1:4 to 1:10. Care should be taken not to have too much water present, otherwise the hydrolysis of the halide is unduly favored. In addition to, or in conjunction with, suitable cooling units, the reaction temperature may be controlled by regulating the rate of admittance of one of the reactants, preferably the halide, or by conducting the reaction in a zone maintained at a constant temperature by the evaporation of a liquid which may or may not be in contact with the reactants.

Our process may be executed to obtain excellent results employing an unsaturated organic halide comprising an unsaturated alkyl chain containing at least three carbon atoms and at least one carbon atom attached to a saturated carbon atom of said atom, but halides containing at least four carbon atoms, one of which is an unsaturated tertiary carbon atom with at least one halogen atom attached to a saturated carbon atom such as isobutenyl halides, isopentenyl halides, isohexenyl halides, their homologues and the like are particularly reactive and especially suitable for our process.

The crude mixture obtained in our process may be used as such for solvent purposes or rearranged or separated in any convenient way. For example, if there is sufficient difference in boiling points the constituents are separated by fractionation. We may also remove the alcohol from the ether if any is present, by washing with a suitable solvent for the organic hydroxy compound, such as water, and recover the organic hydroxy compound by continuous or batch fractionation, as an azeotrope or in anhydrous form. The recovered organic hydroxy compound or its azeotropic mixture or the top layer of such a condensed and stratified mixture may be again utilized.

We have discovered that the ethers of the formula R—O—R' formed in our process, wherein R represents the radical of an unsaturated organic compound wherein a saturated carbon atom is attached to the oxygen atom and R' represents the organic radical of an alcohol, form ternary boiling mixtures comprising ether, alcohol and water, and the binary boiling mixtures comprising ether-water and ether-alcohol.

In the cases where the unsaturated ethers produced form constant boiling mixtures with alcohol and/or water, such phenomena may be availed of for the separation of alcohol and/or water from their admixtures with unsaturated ethers. For example, unsaturated ether containing small amounts of alcohol and/or water may be purified therefrom by fractionating from the ether the tertiary boiling mixture of ether, alcohol and water, or if just alcohol or just water is present, either may be removed as a binary boiling mixture with the unsaturated ether.

Our unsaturated ethers may be employed to purify aqueous solutions of saturated as well as unsaturated alcohols by distillation and removal of a constant boiling mixture comprising ether and water or ether and alcohol. In the first case, the ether can be substantially separated from the water by condensation and stratification of the distillate. In the second case, sufficient water can be added to the condensed distillate and a constant boiling mixture of ether-water driven off, condensed, stratified and the ether substantially recovered. Where ternary azeotropes result as distillate, they can be condensed, stratified, water removed and the remainder returned as reflux until finally a constant boiling mixture of ether-alcohol is distilled off from the bulk of the material undergoing purification.

Our process is adaptable to batch, intermittent or continuous production. In an apparatus for continuous operation, the reaction could be conducted in one stage and the partially or completely reacted mixture rectified in an adjoining stage, in which the product is separated and the unchanged reactants conducted to the first or another reaction stage.

The process may be executed with the reactants in any suitable phase, for example, the halide and organic hydroxy compound may be contacted in the gaseous phase and bubbled through the liquid aqueous solution of alkali, or contacted with said solution countercurrently in a suitable column or tower.

For purposes of illustration only, reference will be had to several examples setting out modes of procedure for preparing specific unsaturated ethers, although it is to be understood that we do not thereby limit our invention. The parts are by weight.

EXAMPLE I

*Allyl ethyl ether*

153 parts of allyl chloride are added to a mixture of 184.5 parts of ethyl alcohol and 320 parts of 50% aqueous sodium hydroxide solution. The mixture is heated under reflux for about two hours with rapid stirring. The reacted mixture is washed with water to remove alcohol and precipitated sodium chloride, dried and fractionated. Allyl ethyl ether was obtained in a yield of about 80%.

Example II

*Allyl isobutenyl ether*

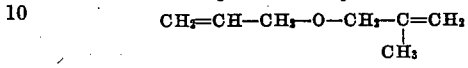

76.5 parts of allyl chloride are mixed with 108 parts of isobutenol

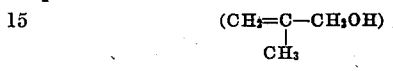

and 160 parts of 50% aqueous sodium hydroxide added. The mixture is violently stirred and heated at about 60° C. for three hours. The cooled mixture is washed, dried and fractionated. Allyl isobutenyl ether is obtained in a yield of about 69%. The ether boils at 115–116° C. and its $$D\tfrac{20}{4}$$

is 0.8167.

Example III

*Cinnamyl propyl ether*

152.5 parts of cinnamyl chloride are added to a mixture of 120 parts of propyl alcohol and 160 parts of 50% aqueous sodium hydroxide solution. The mixture is heated at about 85° C. for three hours. The cooled mixture is washed, dried and fractionated. Cinnamyl propyl ether is obtained in a yield of about 70%.

Example IV

*Isobutenyl ethyl ether*

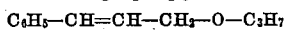

135.3 parts of isobutenyl chloride (CH₂=C—CH₂Cl)
     |
     CH₃ are added to a mixture of 224.4 parts of an aqueous 50% potassium hydroxide solution and 96 parts of 96% ethyl alcohol. The reaction starts when heat is applied. Due to the violence of the exothermic reaction, cooling is necessary. When the reaction has subsided, the mixture is refluxed for two hours. The cooled reaction mixture is washed with water to remove alcohol and KCl, dried and fractionated. Isobutenyl ethyl ether is obtained in a yield of about 73%.

Example V

*Isobutenyl secondary butyl ether*

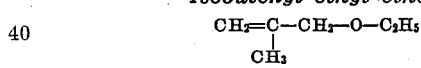

271.5 parts of isobutenyl chloride are mixed with 333.4 parts of secondary butyl alcohol and 470 parts of a solution of 56 parts of potassium hydroxide to 100 parts of water are added. The reaction temperature is maintained at about 75° C. for about one hour. The cooled reaction mixture is washed with water to remove the unreacted alcohol and the KCl formed, dried and fractionated. Isobutenyl secondary butyl ether is obtained in a yield of about 90%. The ether boils at 130–131° C. and its $$D\tfrac{20}{4}$$

is 0.7930.

Example VI

*Diisobutenyl ether*

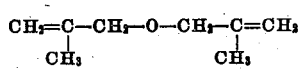

181 parts of isobutenyl chloride are mixed with 216 parts of isobutenol

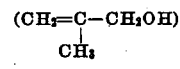

and 160 parts of a 50% aqueous solution of sodium hydroxide added. The mixture is agitated and maintained at a temperature of about 75° C. for one hour. The mixture is cooled, washed with water and fractionated. Part of the diisobutenyl ether is obtained as a ternary constant boiling mixture, boiling at 90° C. and having the composition: diisobutenyl ether 46.06%, isobutenol 26.73% and water 27.21%. Diisobutenyl ether was obtained in a yield of about 90%. The pure ether boils at 134.5° C. and its $$D\tfrac{20}{4}$$

is 0.8127.

Example VII

*Diisobutenyl ether*

290 parts of the upper layer of the azeotropic mixture of isobutenol and water containing 25.7% water is mixed with 181 parts of isobutenyl chloride and 112 parts of solid potassium hydroxide. The mixture is heated under reflux. The reaction starts at about 60° C. The mixture is refluxed for one hour, cooled, decanted from the KCl formed, dried and fractionated. The isobutenol is recovered as a binary constant boiling mixture boiling at 114.06° C. and having the composition: diisobutenyl ether 18.7% and isobutenol 81.3%. When all the alcohol is removed the pure ether distils at 134.5° C. The diisobutenyl ether is recovered in a yield of about 88%.

Example VIII

*Diisobutenyl ether*

5.25 kilos of isobutenyl chloride are added to 6.44 kilos of isobutenol and 7.6 liters of 50% aqueous NaOH added. The mixture is treated in a turbo-mixer at about 90–95° C. and a pressure of about 20 lbs. per sq. in. gauge for about 3 hours. The cooled mixture is washed with water and the upper layer fractionated. The diisobutenyl ether first distills over as a binary constant boiling mixture boiling at 92.48° C. and having the composition: diisobutenyl ether 69% and water 31%. When all the water has been removed as binary constant boiling mixture with the ether, the remaining ether distills at 134.5° C. The ether was obtained in a yield of 92.2%.

Example IX

*Diisobutenyl ether*

90.5 parts of isobutenyl chloride are mixed with 108 parts of isobutenol and a slurry of 56 parts of CaO in 84 parts of water added. The mixture is vigorously stirred and refluxed for 4 hours. The cooled mixture was filtered water added and the mixture fractionated. Diisobutenyl ether is obtained in a yield of about 35%. The diisobutenyl ether is distilled from the alcohol and water as a ternary boiling mixture boiling at 90° C. and having the composition: diisobutenyl ether 46.05%, isobutenol 26.73% and water 27.21%.

Example X

*Isopentenyl isobutenyl ether*

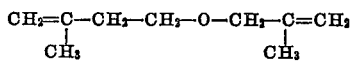

261.3 parts of isopentenyl chloride

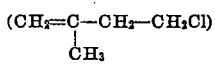

are mixed 270 parts of isobutenol and 336 parts of 50% aqueous KOH added. On warming, the reaction starts. When it has subsided the mixture is refluxed for one hour. The cooled mixture is washed with water and fractionated. Isopentenyl isobutenyl ether is obtained in a yield of 85%.

Example XI

*Diisopentenyl ether*

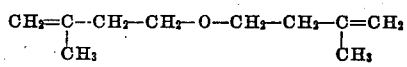

209 parts of isopentenyl chloride are mixed with 258 parts of primary isopentenol and 160 parts of a 50% aqueous solution of NaOH added. The mixture is agitated at about 70° C. for 2 hours. The cooled mixture is washed with water, dried and fractionated. Diisopentenyl ether is obtained in a yield of about 93%.

Example XII

*Isobutenyl isopentenyl ether*

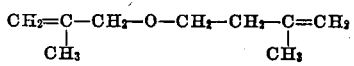

181 parts of isobutenyl chloride and 258 parts of primary isopentenol are mixed and 160 parts of 50% aqueous NaOH added. The agitated mixture is maintained at about 80° C. for two hours. The cooled mixture is washed with water, dried and fractionated. Isobutenyl isopentenyl ether is obtained in a yield of 88%.

Example XIII

*Diisopentenyl ether*

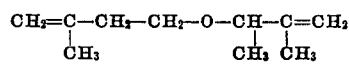

209 parts of isopentenyl chloride, 258 parts of secondary isopentenol

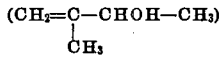

and 240 parts of 50% aqueous NaOH were mixed, agitated and maintained at about 90° C. for two hours. The mixture was cooled, washed with water dried and fractionated. Diisopentenyl ether was obtained in a yield of 75%.

The unsaturated ethers prepared by our process are relatively high boiling compounds. In numerous cases they can be used as raw materials for resins, and as solvents as well as for the production of the corresponding carbonyl compound by splitting or rearrangement. They are also useful as intermediates in the preparation of many valuable organic chemicals and can be utilized as extraction agents for essential oils in the manufacture of flavors, perfumes and the like. We have discovered that our unsaturated ethers do not form peroxides, and further that they prevent peroxide formation and destroy peroxide present in organic compounds containing them, such as saturated ethers, alcohols, ketones, acids and the like. Consequently, the unsaturated ethers may be added to such compounds or their admixtures and thus utilized to prevent peroxide formation or to substantially destroy peroxide or peroxides present.

We claim as our invention:

1. A process for the production of unsaturated ethers which comprises effecting, under alkaline conditions in the initial presence of water, the reaction of an unsaturated organic halide comprising an unsaturated alkyl chain containing at least three carbon atoms and at least one halogen atom attached to a saturated carbon atom of said chain, with an alcohol.

2. A process for the production of unsaturated ethers which comprises effecting, under alkaline conditions, the reaction of an unsaturated organic halide of the formula R—Hal, wherein R represents an unsaturated organic radical comprising an alkyl chain of at least three carbon atoms and linked to the halogen atom by a saturated carbon atom, with an alcohol of the formula R'—OH, R' representing an organic radical which contains one or at least three carbon atoms when R equals the radical

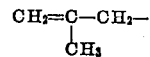

3. A process for the production of unsaturated ethers which comprises effecting, under alkaline conditions and superatmospheric pressure in the initial presence of water, the reaction of an unsaturated organic halide comprising an unsaturated alkyl chain containing at least three carbon atoms and at least one halogen atom attached to a saturated carbon atom of said chain, with an alcohol.

4. A process for the production of unsaturated ethers which comprises effecting, under alkaline conditions in the initial presence of a substantial amount of water, at a temperature below that at which the substantial hydrolysis of the halide is favored, the reaction of an unsaturated organic halide comprising an unsaturated alkyl chain containing at least three carbon atoms and at least one halogen atom attached to a saturated carbon atom, with an alcohol.

5. A process for the production of unsaturated ethers which comprises effecting, under alkaline conditions in the initial presence of a substantial amount of water, at a temperature and for a contact period insufficient for the substantial polymerization of the product, the reaction of an unsaturated organic halide comprising an unsaturated alkyl chain containing at least three carbon atoms and at least one halogen atom attached to a saturated carbon atom, with an alcohol.

6. A process for the production of unsaturated ethers which comprises effecting, under alkaline conditions in the initial presence of water, the reaction of an unsaturated organic halide comprising an alkyl chain containing at least four carbon atoms in an iso-structure one carbon atom of which is tertiary and unsaturated and at least one halogen atom attached to a saturated carbon atom of said chain, with an alcohol.

7. A process for the production of unsaturated ethers which comprises effecting, under alkaline conditions and superatmospheric pressure, the reaction of an unsaturated organic halide of the formula R—Hal, wherein R represents an alkyl chain containing an unsaturated tertiary carbon atom and linked to the halogen atom by a saturated carbon atom, with an alcohol of the formula R'—OH, R' representing an organic radical which contains one or at least three carbon atoms when R contains four carbon atoms.

8. A process for the production of unsaturated ethers which comprises effecting, in the presence of an aqueous solution of a base of the group consisting of alkali and alkaline earth metal bases, the reaction of an unsaturated organic halide comprising an alkyl chain containing at least four carbon atoms in an iso-structure one carbon atom of which is tertiary and unsaturated and at least one halogen atom attached to a saturated carbon atom of said chain, with an alcohol.

9. A process for the production of unsaturated ethers comprising effecting, under alkaline conditions in the initial presence of a substantial amount of water, the reaction of a compound of the formula

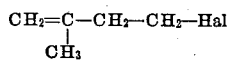

with an alcohol.

10. A process for the production of unsaturated ethers comprising effecting, under alkaline conditions in the initial presence of a substantial amount of water, the reaction of a compound of the formula

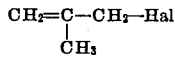

with an alcohol.

11. A process for the production of unsaturated ethers comprising effecting, under alkaline conditions in the initial presence of a substantial amount of water, the reaction of an allyl halide of the formula $CH_2=CH-CH_2-Hal$, with an alcohol.

12. The unsaturated ether of the formula R—O—R' wherein R represents an unsaturated organic radical comprising an alkyl chain containing at least four carbon atoms one of which is tertiary and unsaturated and in an iso-structure attached to the oxygen atom by a saturated carbon atom of said chain and R' represents the radical of an alcohol containing at least three carbon atoms.

13. The unsaturated ether of the formula R—O—R' wherein R represents an unsaturated organic radical comprising an alkyl chain containing at least five carbon atoms one of which is tertiary and unsaturated and in an isostructure attached to the oxygen atom by a saturated carbon atom of said chain and R' represents the radical of an alcohol containing at least three carbon atoms.

14. The unsaturated ether of the formula R—O—R' wherein R represents the organic unsaturated isopentenyl radical

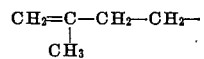

and R' represents the radical of an alcohol.

15. The unsaturated ether of the formula R—O—R' wherein R represents the unsaturated isobutenyl radical

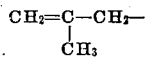

and R' represents the radical of an alcohol containing at least three carbon atoms.

16. The alkenyl isobutenyl ether containing at least seven carbon atoms.

17. A process for the production of unsaturated ethers which comprises effecting, under alkaline conditions in the initial presence of water, the reaction of an unsaturated organic halide comprising an unsaturated alkyl chain containing at least three carbon atoms and at least one halogen atom attached to a saturated carbon atom of said chain, with an organic hydroxy compound.

18. A process for the production of unsaturated ethers which comprises effecting, under alkaline conditions and superatmospheric pressure in the initial presence of water, the reaction of an unsaturated organic halide comprising an unsaturated alkyl chain containing at least three carbon atoms and at least one halogen atom attached to a saturated carbon atom of said chain, with an organic hydroxy compound.

19. A process for the production of unsaturated ethers which comprises effecting, under alkaline conditions in the initial presence of a substantial amount of water, at a temperature below that at which the substantial hydrolysis of the halide is favored, the reaction of an unsaturated organic halide comprising an unsaturated alkyl chain containing at least three carbon atoms and at least one halogen atom attached to a saturated carbon atom, with an organic hydroxy compound.

20. A process for the production of unsaturated ethers which comprises effecting, under alkaline conditions in the initial presence of water, the reaction of an unsaturated organic halide comprising an alkyl chain containing at least four carbon atoms in an iso-structure, one carbon atom of which is tertiary and unsaturated and at least one halogen atom attached to a saturated carbon atom of said chain, with an organic hydroxy compound.

21. A process for the production of unsaturated ethers which comprises effecting, under alkaline conditions and superatmospheric pressure, the reaction of an unsaturated organic halide comprising an alkyl chain containing at least four carbon atoms in an iso-structure one carbon atom of which is tertiary and unsaturated and at least one halogen atom attached to a saturated carbon atom of said chain, with an organic hydroxy compound.

22. A process for the production of unsaturated ethers which comprises effecting, under alkaline conditions, the reaction of an unsaturated organic halide comprising an unsaturated alkyl chain containing at least three carbon atoms and at least one halogen atom attached to a saturated carbon atom, with an alcohol containing one carbon atom.

23. The unsaturated ether of the formula R—O—R' wherein R represents an unsaturated organic radical comprising an alkyl chain containing at least four carbon atoms one of which is tertiary and unsaturated and in an iso-structure attached to the oxygen atom by a saturated carbon atom of said chain and R' represents the radical of an unsaturated alcohol.

24. The constant boiling mixture of an unsaturated ether and water obtainable on distillation of a mixture resulting on reaction of an unsaturated halide comprising an alkyl chain which contains an unsaturated tertiary carbon atom and is linked to a halogen atom by a saturated carbon atom with an alcohol containing at least three carbon atoms under alkaline conditions in the presence of water.

25. The constant boiling mixture of an unsaturated ether and an alcohol obtainable on distillation of a mixture resulting on reaction of an unsaturated halide comprising an alkyl chain which contains an unsaturated tertiary carbon atom and is linked to a halogen atom by a saturated carbon atom with an alcohol containing at least three carbon atoms under alkaline conditions.

26. The constant boiling mixture of an unsaturated ether, an alcohol and water obtainable on distillation of a mixture resulting on reaction of an unsaturated halide comprising an alkyl chain which contains an unsaturated tertiary carbon atom and is linked to a halogen atom by a saturated carbon atom with an alcohol containing at least three carbon atoms under alkaline conditions in the presence of water.

27. The unsaturated ether of the general formula R—O—R' wherein R represents an unsaturated organic radical comprising an alkyl chain embracing an olefinic linkage and containing at least four carbon atoms one of which is linked to at least three other carbon atoms and one of which is saturated and linked to the ether oxygen atom, and R' represents the radical of an alcohol containing at least three carbon atoms.

28. The diisobutenyl ether of the formula

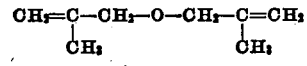

HERBERT P. A. GROLL.
CLARENCE J. OTT.